(12) United States Patent
Matsubara et al.

(10) Patent No.: US 6,767,669 B2
(45) Date of Patent: Jul. 27, 2004

(54) NEGATIVE ELECTRODE FOR LITHIUM RECHARGEABLE BATTERIES AND LITHIUM RECHARGEABLE BATTERIES

(75) Inventors: Keiko Matsubara, Yokohama (JP); Toshiaki Tsuno, Yokohama (JP); Sang-Young Yoon, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 224 days.

(21) Appl. No.: 09/925,355

(22) Filed: Aug. 8, 2001

(65) Prior Publication Data
US 2002/0039684 A1 Apr. 4, 2002

(30) Foreign Application Priority Data
Aug. 21, 2000 (JP) ........................................ 2000-250256

(51) Int. Cl.$^7$ ................................................ H01M 4/48
(52) U.S. Cl. ................................ 429/231.8; 429/231.4; 429/231.95; 429/322
(58) Field of Search .......................... 429/231.8, 231.4, 429/231.95, 322

(56) References Cited

U.S. PATENT DOCUMENTS 6,284,409 B1 * 9/2001 Higashiyama et al. ... 429/218.2
6,322,930 B1 * 11/2001 Yoshimura et al. ......... 429/341

FOREIGN PATENT DOCUMENTS

JP 57-103274 * 6/1982

* cited by examiner

*Primary Examiner*—Laura Weiner
(74) *Attorney, Agent, or Firm*—Christie, Parker & Hale, LLP

(57) ABSTRACT

A negative electrode for a lithium rechargeable battery includes a carbon material in which lithium intercalation occurs, and at least one metallic oxide selected from yttrium oxide, cerium oxide, and titanium oxide.

6 Claims, 1 Drawing Sheet

NEGATIVE ELECTRODE FOR LITHIUM RECHARGEABLE BATTERIES AND LITHIUM RECHARGEABLE BATTERIES

CROSS REFERENCE TO RELATED APPLICATION

This application is based on application No. 2000-250256 filed with the Japanese Patent Office on Aug. 21, 2000, the content of which is incorporated herein by reference.

BACKGROUND OF THE INVENTION (a) Field of the Invention

The present invention relates to a negative electrode for lithium rechargeable batteries and lithium rechargeable batteries, and particularly, to a negative electrode having an increased diffusion rate of lithium ion and in which a large amount of a non-aqueous electrolyte is immersed.

(b) Description of the Related Art

As electronic products tend to be more and more miniature in size, lighter in weight, and higher in quality and performance, there are demands for lithium rechargeable batteries exhibiting higher capacity.

Currently, a negative electrode for lithium rechargeable batteries is produced by coating a slurry including a carbon material as a negative active material and a polymer binder on a collector such as a copper foil, drying the coated collector and then roll-pressing the dried collector. In the resulting negative electrode, the carbon material is impregnated on the collector.

Several methods have been suggested to increase capacities of lithium rechargeable batteries, and the most effective method is increasing the amount of active material contained in a battery. To increase the amount of the negative active material without increasing the total volume of the battery, the thickness of the negative active material film on the current collector should be reduced. This may be accomplished by pressing procedures in which a negative electrode prepared by coating a negative active material slurry on a collector is pressed, resulting an increase in density of the negative active material.

However, there are some problems in the case where the negative mixed material is dense. Such a higher density decreases the porosities of the negative active material slurry so that it is difficult to immerse an electrolyte to the negative active material, and decreases the diffusion rate of lithium ion for the negative electrode so that the intercalation reaction of the lithium ion does not readily occur and the charge and discharge efficiency decreases.

The drop of diffusion rate of lithium ion is larger as the discharge rate is higher. Even though the amount of the carbon material increases in the pressing procedures, the discharge capacity decreases and the cycle life characteristics deteriorate during the discharge at a high rate.

SUMMARY OF THE INVENTION

It is an object of the present invention to provide a lithium rechargeable battery which has a higher charge and discharge efficiency and higher discharge capacity and a good cycle life during discharge at a high rate, resulting from increasing the retention of electrolyte in the negative electrode, and increasing the diffusion rate of lithium ion.

These and other objects may be achieved by a negative electrode for a lithium rechargeable battery including a carbon material in which lithium intercalation reversibly occurs and at least one metallic oxide selected from yttrium oxide, cerium oxide, and titanium oxide.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
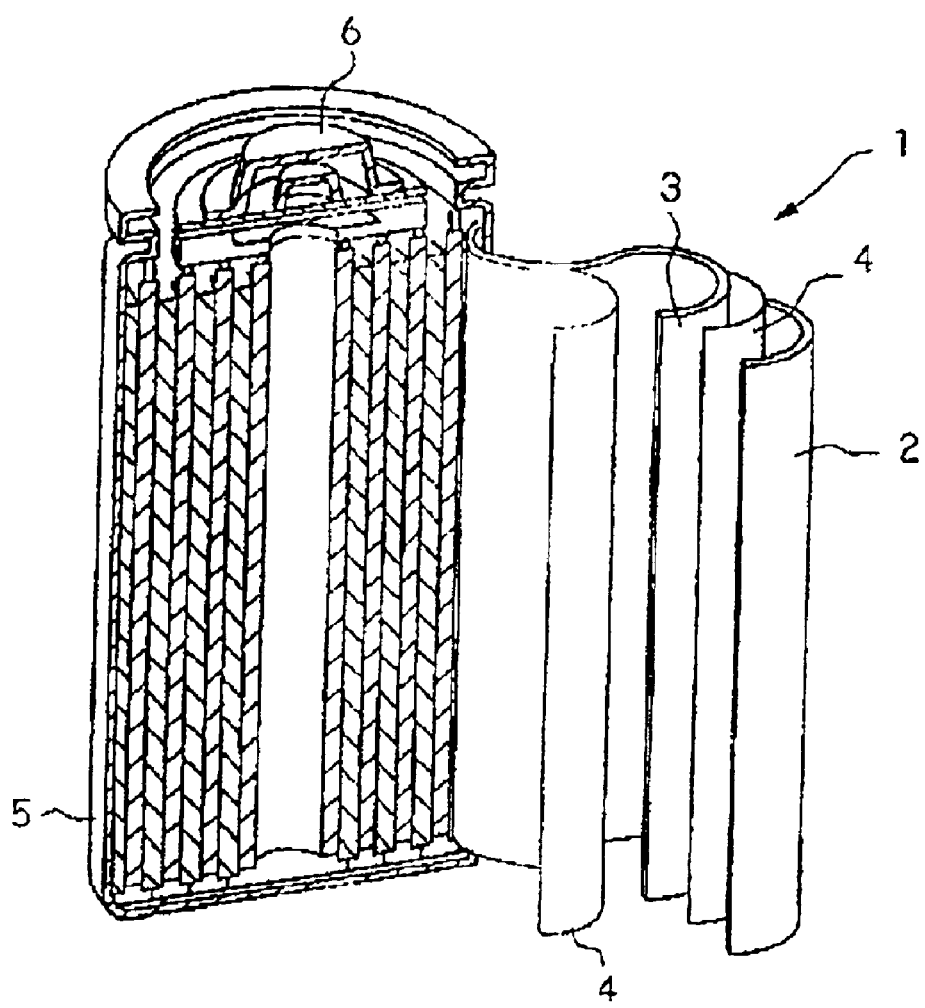
FIG. 1 is a side cross sectional view showing a lithium rechargeable battery according to the present invention.

A negative electrode for a lithium rechargeable battery of the present invention includes a carbon material in which lithium intercalation reversibly occurs and at least one metallic oxide. The metallic oxide is preferably selected from yttrium oxide, cerium oxide, and titanium oxide, and is more preferably yttrium oxide.

The amount of the carbon material is in the range of 1 to 20 weight parts based on 100 weight parts of the carbon material.

The average diameter of the metallic oxide is in the range of 10 nm to 10 $\mu$m.

The electrode for a lithium rechargeable battery includes a carbon material and at least one metallic oxide selected from yttrium oxide, cerium oxide, and titanium oxide. The metallic oxide has a good wettability to a non-aqueous electrolyte. The good wettability of the metallic oxide leads to improve wettability of the negative electrode and helps to enable easy immersion of the electrolyte into the negative electrode so that lithium intercalation readily occurs and the charge and discharge efficiency increases.

Furthermore, since yttrium oxide dramatically increases diffusion rate of lithium ions, it can improves more discharge capacity and cycle characteristics than other metallic oxides.

The yttrium oxide does not electrochemically react with lithium ion, and lithium intercalation does not occur in the yttrium oxide. This causes no abruptly change of the potential of the electrode and provides electrical energy of constant voltage.

The amount of the metallic oxide is preferably in the range of 1 to 20 parts by weight based on 100 parts by weight of the carbon material. In the case where the amount of the metallic oxide is less than 1 part by weight part based on 100 weight parts of the carbon material, the easy immersion of electrolyte into the negative electrode is not satisfied. In addition, in the case where the amount of the metallic oxide is more than 20 parts by weight based on 100 parts by weight of the carbon material, the charge and discharge capacity may decrease, since the amount of the carbon material relatively decreases.

The negative electrode for a lithium rechargeable battery may be produced by forming the negative material slurry including a carbon negative active material, a metallic oxide and a polymer binder in the predetermined shape, and may be immersed in a collector such as copper. The electrode of the present invention is not limited as mentioned above, and may be manufactured through various methods other than the aforementioned.

A lithium rechargeable battery of the present invention includes a negative electrode as mentioned above, a positive electrode and a non-aqueous electrolyte. The positive electrode includes a positive active material in which lithium intercalation reversibly occurs, and the non-aqueous electrolyte includes a lithium salt.

The negative electrode includes a carbon material in which lithium intercalation occurs, and at least one metallic oxide. The metallic oxide is selected from yttrium oxide, cerium oxide, and titanium oxide and is more preferably yttrium oxide.

The rechargeable lithium battery preferably includes 1 to 20 parts by weight of the metallic oxide based on 100 weight parts of the carbon material.

Further, it is preferable that the average diameter of the metallic oxide is in the range of 10 nm to 10 $\mu$m.

The metallic oxide included in the negative electrode of the presentive rechargeable lithium battery has a good wettability to a non-aqueous electrolyte and helps to enable easy immersion of the electrolyte into the negative electrode such that the battery reaction uniformly occurs, lithium intercalation actively occurs and charge and discharge efficiency increases.

In addition, since yttrium oxide can increase the diffusion rate of lithium ions, discharge capacity and cycle characteristics may improve at a high rate.

Since yttrium oxide does not electrochemically react with lithium ion, lithium intercalation does not occur in yttrium oxide. This allows substantially constant potential of the electrode and provides constant voltage and electrical energy.

The amount of the metallic oxide is preferably as aforementioned and the reasons are also illustrated as aforementioned. The average diameter of the metallic oxide is preferably as aforementioned, and the reasons are also illustrated as aforementioned.

The lithium rechargeable battery of the present invention may be fabricated in various types of shape such as a cylinder, a prism, a disk, and a sheet. The shape of the lithium rechargeable battery is not limited as the mentioned, and may be shaped in various forms other than the aforementioned.

The positive electrode of the present invention is produced from a positive active material composition including a positive active material, a conductive agent, and a binder.

The positive active material may be a compound in which lithium intercalation reversibly occurs, such as $LiMn_2O_4$, $LiCoO_2$, $LiNiO_2$, $LiFeO_2$, $V_2O_5$, TiS, or MoS.

As a separator used in the rechargeable lithium battery of the present invention, a porous olefin film, such as polyethylene and polypropylene, or a polymer electrolyte film may be used.

The non-aqueous electrolyte includes an aprotic solvent and a lithium salt in the solvent. The aprotic solvent includes propylene carbonate, ethylene carbonate, butylene carbonate, benzonitrile, acetonitrile, tetrahydrofurane, 2-methyltetrahydrofurane, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, dimethylcarbonate, diethylcarbonate, methylpropylcarbonate, methylisopropylcarbonate, ethylpropylcarbonate, dipropylcarbonate, diisopropylcarbonate, dibutylcarbonate, diethylenglycol, dimethylether, or a mixture thereof. The lithium salt includes $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2(C_yF_{2y+1}SO_2)$ (where x and y are natural numbers), LiCl, LiI or a mixture thereof.

The polymer electrolyte film is prepared by adding the electrolyte to a polymer material and gelating the resulting mixture.

The rechargeable lithium battery of the present invention will be illustrated with reference to the accompanying drawing. The rechargeable lithium battery of the present invention is not limited to the following description.

FIG. 1 shows a cylindrical lithium rechargeable battery 1 according to the present invention. The lithium rechargeable battery 1 includes a sheet-type negative electrode 2, a sheet-type positive electrode 3, a separator 4 interposed between the negative electrode 2 and the positive electrode 3, a non-aqueous electrolyte, a cylindrical battery case 5, and a gasket 6. The electrolyte includes lithium salt and is immersed in the positive electrode 2, the negative electrode 3, and the separator 4.

The lithium rechargeable battery 1 includes the negative electrode 2, the positive electrode 3 and the separator 4. The negative electrode 2, the positive electrode 3 and the separator 4 are referred to as an electrode element. The electrode element is spirally wound and inserted into the battery case 5.

The negative electrode 2 forms by coating a negative active material composition on a collector such as a copper foil. The negative active material composition includes a carbon material as a negative active material, at least one metallic oxide selected from yttrium oxide ($Y_2O_3$), cerium oxide ($CeO_2$), and titanium oxide ($TiO_2$), and a polymer binder such as a polyvinylidene fluoride.

As the negative material, the carbon material is preferably artificial graphite, natural graphite, a graphitized-carbon fiber, or an amorphous carbon, in which lithium intercalation reversibly occurs. The conventional negative active material may be used as the negative material of the present invention.

The metallic oxide having a good wettability to the non-aqueous electrolyte improves the wettability of the negative electrode 2 to the non-aqueous electrolyte and helps to enable easy immersion of the electrolyte into the negative active material.

The amount of the metallic oxide is preferably from 1 to 20 parts by weight based on 100 parts by weight of the carbon material, and more preferably from 3 to 5 parts by weight.

In the case where the amount of metallic oxide is less than one part by weight, the easy immersion of the electrolyte into the negative active material is not satisfied. In the case where the amount of metallic oxide is more than 20 parts by weight, the amount of the carbon material becomes relatively decreased, and the charge and discharge capacity of the negative electrode 2 decrease.

The average diameter of the metallic oxide is preferably in the range of 10 nm to 10 $\mu$m, and more preferably is in the range of 50 nm to 200 nm.

In the case where the average diameter of the metallic oxide is less than 10 nm, immersion of the electrolyte into the negative active material is not easy. On the other hand, in the case where the average diameter of the metallic oxide is more than 10 $\mu$m, the diffusion rate of lithium ion for the negative electrode 2 may decrease.

The use of the metallic oxide may increase in the diffusion rate of lithium ion, as well as in the easy immersion of the electrolyte for the negative electrode 2. Accordingly, the lithium rechargeable battery 1 has a higher charge and discharge efficiency, a higher discharge capacity, and improved cycle characteristics.

In particular, the use of yttrium oxide ($Y_2O_3$) as the metallic oxide may bring the more increased diffusion rate of lithium ion for the negative electrode 2.

Since the yttrium oxide does not electrochemically react with lithium ion, and the intercalation reaction of lithium ions does not occur in yttrium oxide, there are not any redox potentials due to the reaction between the yttrium oxide and lithium ion. Therefore, the potential of the negative electrode 2 appears only due to the intercalation reaction of lithium ion to the carbon material, the potential of the electrode may not extremely change, and the voltage of the electrode may be stable.

The positive electrode 3 of the present invention is prepared by coating a positive active material composition on a collector such as an aluminum foil. The positive active material composition includes a positive active material, a conductive agent, such as graphite, a polymer binder such as polyvinylidene fluoride.

The preferred positive active material may include $LiMn_2O_4$, $LiCoO_2$, $LiNiO_2$, $LiFeO_2$, $V_2O_5$, TiS, or MoS, in which lithium intercalation reversibly occurs. The conventional positive active materials may be also used as the positive active material.

As a separator, a porous olefin film such as polyethylene or polypropylene may be used.

The electrolyte includes an aprotic solvent and a lithium salt in the solvent. The aprotic solvent includes propylene carbonate, ethylene carbonate, butylene carbonate, benzonitrile, acetonitrile, tetrahydrofurane, 2-methyltetrahydrofurane, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, dimethylcarbonate, diethylcarbonate, methylpropylcarbonate, methylisopropylcarbonate, ethylpropylcarbonate, dipropylcarbonate, diiosopropylcarbonate, dibutylcarbonate, diethylenglycol, dimethylether, or a mixture thereof. The lithium salt includes $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI or a mixture thereof.

In addition, the separator may be a polymer electrolyte film prepared by gelating a mixture of a polymer and the electrolyte as aforementioned.

The following examples further illustrate the present invention, but the invention is not limited by these examples.

EXAMPLE 1

5 parts by weight of yttrium oxide ($Y_2O_3$) having an average diameter of 50 nm as a metallic oxide was sufficiently mixed with 100 parts by weight of natural graphite having an average diameter of 15 μm, and N-methyl pyrrolidone was further mixed therewith. As a result, yttrium oxide was sufficiently distributed with the resulting mixture.

10 parts by weight of polyvinylidene fluoride was dissolved in the mixture to prepare a slurry. The slurry was coated on 14 μm-copper foil by a doctor-blade. Then, the coated slurry was dried under 120° C. under vacuum for 24 hours to vaporize the N-methyl pyrrolydone. The thickness of the coated slurry was 100 μm.

The coated copper foil was cut into a coin shape, with an average diameter of 13 mm to produce a negative electrode.

Using the negative electrode as a working electrode, and lithium metal cut into a coin shape as a counter electrode, a coin-type test half-cell was fabricated. A separator was interposed between the negative and the counter electrodes. As a non-aqueous electrolyte, 1M $LiPF_6$ in a mixture of propylene carbonate (PC), diethyl carbonate (DEC), and ethylene carbonate (EC) was used.

EXAMPLES 2 to 3

Coin-type half-cells were fabricated as in the same manner of fabrication as the cell of Example 1, except that $CeO_2$ and $TiO_2$ were respectively used instead of yttrium oxide ($Y_2O_3$) as a metallic oxide.

Comparative Examples 1 to 4

Coin-type half-cells were fabricated as in the same manner of fabrication as the cell of Example 1, except that ZnO, CuO, $SiO_2$, and $SnO_2$ were respectively used instead of yttrium oxide ($Y_2O_3$) as a metallic oxide.

Comparative Example 5

A coin-type half-cell was fabricated as in the same manner of fabrication as the cell of Example 1 except that a metallic oxide was not used.

A charge and discharge test of the half-cells according to Examples 1 to 3 and Comparative Examples 1 to 5 was performed under the condition of a charge and discharge current of 0.2 C and a charge and discharge cycle of 3 times, and was subsequently performed under the condition of a charge and discharge current of 1.0 C and a charge and discharge cycle of 60 times.

The charge and discharge capacity of the first cycle at 0.2 C, and the capacity retention of the $60^{th}$ cycle at 1.0 C to the first cycle were respectively measured. The results are shown in Table 1.

TABLE 1

|  | Kind of a metallic oxide | A charge and discharge capacity (%) of the first cycle at 0.2 C | A capacity retention (%) of the $60^{th}$ cycle at 1.0 C to the first cycle |
| --- | --- | --- | --- |
| Example 1 | $Y_2O_3$ | 94.5 | 67.0 |
| Example 2 | $CeO_2$ | 91.7 | 43.1 |
| Example 3 | $TiO_2$ | 91.1 | 44.2 |
| Comparative example 1 | ZnO | 86.5 | 64.8 |
| Comparative example 2 | CuO | 85.1 | 64.1 |
| Comparative example 3 | $SiO_2$ | 92.3 | 31.7 |
| Comparative example 4 | $SnO_2$ | 83.5 | 13.5 |
| Comparative example 5 | — | 92.2 | 37.4 |

As shown in Table 1, the charge and discharge efficiency and the capacity retention of Example 1, where yttrium oxide ($Y_2O_3$) was used, were respectively 94.5% and 67.0%. Compared to the results of Comparative Example 5, where only graphite was used, the charge and discharge efficiency of Example 1 increased by about 2%, and the capacity retention of Example 1 greatly increased by about 30%.

The capacity retentions of Comparative Examples 1 and 2 were higher than Comparative Example 5 and relatively corresponded to that of Example 1. However, the charge and discharge efficiency of Comparative Examples 1 and 2 decreased by 7%, compared to that of Comparative Example 5.

The charge and discharge efficiencies of Examples 2 and 3 were similar to that of Comparative Example 5, and the capacity retention of Examples 2 and 3 increased more than that of Comparative Example 5.

The charge and discharge efficiency of Comparative Example 3 is similar to that of Comparative Example 5. However, the capacity retention of Comparative Example 3 decreased of 5.7% more than that of Comparative Example 5.

As a result, in Example 1 where yttrium oxide ($Y_2O_3$) was used, both the charge and discharge efficiency and the capacity retention or a cycle characteristic increased more than Comparative Example 5. It is believed that yttrium oxide increases the diffusion rate of lithium and helps to enable easy immersion of the electrolyte into the negative electrode. Such actions of yttrium oxide uniformly diffuse the lithium ions through the negative electrode at high rate such as 1.0C, and this allows the effective use of graphite as a negative active material.

In addition, as shown in Example 2 and Example 3, where $CeO_2$ and $TiO_2$ were respectively used, the charge and discharge efficiency corresponded to that of Comparative Example 5, but the capacity retention of Examples 2 and 3 increased more than that of Comparative Example 5. Therefore, the use of $CeO_2$ and $TiO_2$ may improve the cycle characteristics of the negative electrode.

The scope of the present invention is not limited to the Examples, and various modifications can be made without departing from the spirit of the present invention. For example, the examples were related to the cylindrical lithium cell, but the present invention can be applied to prismatic, coin or sheet type cells.

According to the present invention, the negative electrode for the lithium rechargeable battery includes at least a carbon material and a metallic oxide. Since the metallic oxide may helps to enable easy immersion of the electrolyte into the negative electrode for the lithium rechargeable battery, and the charge and discharge efficiency may increase.

In addition, since the use of yttrium oxide increases the diffusion rate of lithium ion, the discharge capacity and cycle characteristics may increase.

Finally, since the yttrium oxide does not electrochemically react with lithium ion, and the intercalation reaction of lithium ions does not occur in yttrium oxide, there are not any redox potentials due to the reaction between the yttrium oxide and lithium ion. Therefore, the potential of the negative electrode 2 appears only due to lithium ion's absorbance and release to the carbon material, the potential of the electrode may not extremely change, and the voltage of the electrode may be stable.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative electrode for a lithium rechargeable battery comprising:

a carbon material in which lithium intercalation reversibly occurs; and yttrium oxide.

2. A lithium rechargeable battery comprising:

the negative electrode of claim 1;

a positive electrode comprising a positive active material in which lithium intercalation reversibly occurs; and a non-aqueous electrolyte comprising lithium salt.

3. A negative electrode for a lithium rechargeable battery comprising:

a carbon material in which lithium intercalation reversibly occurs; and at least one metallic oxide selected from the group consisting of yttrium oxide, cerium oxide, and titanium oxide wherein the amount of the metallic oxide ranges from 1 to 20 weight parts based on 100 weight parts of the carbon material.

4. A lithium rechargeable battery comprising:

the negative electrode of claim 3;

a positive electrode comprising a positive active material in which lithium intercalation reversibly occurs; and a non-aqueous electrolyte comprising lithium salt.

5. A negative electrode for a lithium rechargeable battery comprising:

a carbon material in which lithium intercalation reversibly occurs; and at least one metallic oxide selected from the group consisting of yttrium oxide, cerium oxide, and titanium oxide wherein the average diameter of the metallic oxide ranges from 10 nm to 10 $\mu$m.

6. A lithium rechargeable battery comprising:

the negative electrode of claim 5;

a positive electrode comprising a positive active material in which lithium intercalation reversibly occurs; and a non-aqueous electrolyte comprising lithium salt.

* * * * *